United States Patent
Beck et al.

(10) Patent No.: US 7,919,543 B2
(45) Date of Patent: Apr. 5, 2011

(54) INKJET INKS, METHODS FOR APPLYING INKJET INK, AND ARTICLES PRINTED WITH INKJET INKS

(75) Inventors: Charles L. Beck, New Hampton, NH (US); Stephen J. Mills, Plymouth, NH (US)

(73) Assignee: Electronics for Imaging, Inc., Foster City, CA (US)

( * ) Notice: Subject to any disclaimer, the term of this patent is extended or adjusted under 35 U.S.C. 154(b) by 536 days.

(21) Appl. No.: 11/353,754

(22) Filed: Feb. 14, 2006

(65) Prior Publication Data

US 2007/0043145 A1 Feb. 22, 2007

Related U.S. Application Data

(60) Provisional application No. 60/708,614, filed on Aug. 16, 2005.

(51) Int. Cl.
*C09D 11/00* (2006.01)
*G01D 11/00* (2006.01)
*B41J 2/01* (2006.01)
*C08F 8/30* (2006.01)

(52) U.S. Cl. ........ 523/160; 523/161; 524/555; 347/100; 347/101; 106/31.85

(58) Field of Classification Search ............. 523/160, 523/161; 528/75, 85; 522/90; 347/100, 347/101; 524/555; 106/31.85
See application file for complete search history.

(56) References Cited

U.S. PATENT DOCUMENTS

| | | | | |
|---|---|---|---|---|
| 4,990,186 A | * | 2/1991 | Jones et al. | 106/31.37 |
| 5,397,387 A | * | 3/1995 | Deng et al. | 106/31.37 |
| 5,710,195 A | * | 1/1998 | Subbaraman et al. | 524/31 |
| 5,847,026 A | * | 12/1998 | Kitahara et al. | 523/161 |
| 6,106,600 A | * | 8/2000 | Lecheheb et al. | 106/31.37 |
| 6,530,986 B2 | * | 3/2003 | Walker et al. | 106/31.6 |
| 6,551,391 B1 | * | 4/2003 | Gerhardt et al. | 106/31.58 |
| 6,568,795 B1 | * | 5/2003 | Sharma et al. | 347/65 |
| 6,663,702 B1 | * | 12/2003 | Day | 106/31.27 |
| 6,869,986 B1 | * | 3/2005 | Millot et al. | 523/160 |
| 2001/0000253 A1 | * | 4/2001 | Matzinger | 523/160 |
| 2003/0083396 A1 | * | 5/2003 | Ylitalo et al. | 522/74 |
| 2003/0095168 A1 | * | 5/2003 | Blease et al. | 347/92 |
| 2003/0144375 A1 | * | 7/2003 | Wu et al. | 523/160 |
| 2004/0050290 A1 | * | 3/2004 | Andrievsky et al. | 106/31.27 |
| 2004/0097684 A1 | * | 5/2004 | Bruchmann et al. | 528/44 |
| 2004/0110868 A1 | * | 6/2004 | Zhu et al. | 523/160 |
| 2005/0113481 A1 | * | 5/2005 | Sabys et al. | 523/160 |

FOREIGN PATENT DOCUMENTS

| | | | |
|---|---|---|---|
| DE | 19933889 | | 1/2001 |
| GB | 2 328 690 | | 3/1999 |
| WO | WO9961533 | * | 5/1999 |
| WO | WO0109255 | * | 2/2001 |
| WO | WO 01/36546 | | 5/2001 |
| WO | WO0236695 | * | 5/2002 |
| WO | WO 2006/120227 | | 11/2006 |

OTHER PUBLICATIONS

Richard J. Lewis, Sr. "Hawley's Condensed Chemical Dictionary, 12th Edition", John Wiley & Sons, Inc., New York pp. 660 and 1227 (1993).*
Material Safety Data Sheet Evonik Industries p. 1-14.*
Dipropylenegylcol monomethyl ether p. 1-2.*
Material Safety Data Sheet Copper Phthalocyanine pp. 1-6.*

* cited by examiner

*Primary Examiner* — Basia Ridley
*Assistant Examiner* — Alexander C Kollias
(74) *Attorney, Agent, or Firm* — Michael A. Glenn; Glenn Patent Group

(57) ABSTRACT

Compositions for inkjet inks, methods for applying the ink to a surface of a substrate, and articles that include indicia printed with the ink. The inkjet inks include a cellulose polymer and a liquid carrier. Unlike currently available commercial inks, the inkjet inks of this invention can be formulated with less toxic ingredients, thus reducing the risks of negative impact on environmental quality and the health and safety of workers who use the inks.

15 Claims, No Drawings

INKJET INKS, METHODS FOR APPLYING INKJET INK, AND ARTICLES PRINTED WITH INKJET INKS

REFERENCE TO RELATED APPLICATIONS

This application claims the benefit of U.S. Provisional Application Ser. No. 60/708,614, filed 16 Aug. 2005, which is incorporated by reference herein in its entirety.

BACKGROUND

Inkjet printing is a non-impact method for producing images by depositing ink droplets on an image-recording element in response to digital signals. Various methods have been used to control the deposition of the ink droplets on the image-recording element. In one process, known as a continuous inkjet printing process, a continuous stream of droplets is charged and deflected in an image-wise manner onto the surface of the image-recording element, while unimaged droplets are caught and returned to an ink sump. In another process, known as a drop-on-demand inkjet printing process, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets, including industrial labeling, short run printing, fleet graphics (e.g., those used on large advertisement signs), and desktop document and pictorial imaging.

Special challenges exist in formulating inks suitable for use in inkjet printers because inkjet printing applications often demand many different properties from the inks employed in the application. Examples of specific properties required of suitable inks include the ability to adhere to specific types of substrate materials, the ability to adhere to a broad range of substrate materials, the ability to cure or dry within a certain allotment of time, and/or the ability to withstand various environmental conditions. In addition, ink formulations should also be compatible with printing equipment and methods.

In order to meet these special challenges, prior art inkjet inks have often included chemicals that are toxic or environmentally hazardous. For example, conventional ink formulations, especially those for commercial use, often rely on a number of ingredients whose environmental and human health profiles can be improved. Foremost among them are solvents, many of which are problematic: the ethylene glycol ethers raise many human health concerns, including potential blood, kidney, reproductive, and central nervous system effects. Benzyl alcohol poses both human health and environmental concerns, especially for their potential toxicity to aquatic organisms. Solvents having low flash point or high volatility pose environmental hazards. Some common surfactants, like the nonylphenol ethoxylates, biodegrade to compounds that are more aquatically toxic than the parent, persist in the environment, and may disrupt endocrine systems (responsible for metabolism, reproduction, and growth). These toxic chemicals threaten the safety and health of those people that handle the chemicals, and often leach or migrate into groundwater or other portions of the environment. Also, ventilation of the printing and ink manufacturing equipment in order to mitigate the health risks associated with using these chemicals increases production costs.

A need exists for inkjet ink formulations that overcome or minimize these problems, yet adhere to a relatively broad range of substrate materials.

SUMMARY

This invention relates to inkjet inks, methods for applying inkjet inks, and articles printed with inkjet inks.

In some embodiments, this invention includes inkjet ink compositions. In one embodiment, the inkjet composition comprises a cellulose-based polymer in an amount of between about 0.1% to about 10% by weight of the ink composition and a liquid carrier in an amount of between about 10% to about 90% by weight of the ink composition. Preferably, the liquid carrier includes a biologically derived solvent, such as ethyl lactate. More preferably, the liquid carrier is from renewable sources (biological), as opposed to petroleum based sources.

In another embodiment, the inkjet ink composition comprises a nitrocellulose polymer in an amount of between about 0.1% to about 10% by weight of the ink composition; ethyl lactate in an amount of between about 10% to about 90% by weight of the ink composition; at least one pigment in a total amount of no greater than about 10% by weight of the ink composition; and at least one additive selected from the group consisting of a defoaming agent, deaerating agent, a wetting agent, a dispersing agent, an anticrater additive, a surface tension modifying agent, a UV absorption agent, and a light stabilizing agent, wherein the total amount of additive in the ink composition is no greater than about 10% by weight of the ink composition.

In other embodiments, this invention features a method of applying indicia to a substrate. In one embodiment, the method comprises the steps of directing a stream of ink droplets to a substrate, wherein said ink droplets include a nitrocellulose polymer in an amount of between about 0.1% to about 10% by weight of the ink droplets and ethyl lactate in an amount of between about 10% to about 90% by weight of the ink droplets; and electronically controlling the deposition so that the droplets form at least one printed image on the substrate, thereby applying indicia to the substrate.

In further embodiments, this invention features articles comprising a substrate with a surface, and at least one image printed on said surface through the deposition of an inkjet ink. The inkjet ink deposited on the surface includes a nitrocellulose polymer in an amount of between about 0.1% to about 10% by weight of the ink composition and ethyl lactate in an amount of between about 10% to about 90% by weight of the ink composition.

The inkjet inks of the present invention preferably use ingredients from renewable sources (biological) as opposed to petroleum based sources.

This invention provides for inkjet inks, printing methods, and articles that are less toxic or environmentally harmful, thereby reducing costs and risks associated with inks and the use of inks that are not environmentally friendly. For example, the present invention reduces the threat to human health as well as the environment because the inks of the invention do not contain harmful or toxic components. For example, the present invention reduces the amount of toxic or harmful components to which humans (e.g., practitioners of the invention) are exposed through skin contact or inhalation. Also, this invention reduces human exposure to toxic or harmful components that can eventually leach, or in some other way, migrate from a printed article or surface and contaminate groundwater or enter the food chain.

Furthermore, the inks of the present invention can be used on a wide variety of substrate materials and are durable to challenging environmental conditions, such as exposure to seasonal outdoor weather, thereby reducing the expense associated with inks that are not as versatile or long-lasting. Also, because the inks of this invention do not include, or include a reduced amount of, toxic or harmful components, the ink itself can be shipped at reduced costs compared to the shipping costs normally incurred when shipping inks that have toxic or harmful components. In addition, the safety measures or safeguards needed by practitioners of this invention are not as stringent, and therefore less expensive, than those associated with inks having toxic or harmful components. For example, practicing this invention can reduce the need for some expensive safety equipment that is often necessary when working with inks having toxic or harmful components.

DETAILED DESCRIPTION

A description of preferred embodiments of the invention follows. Although this invention has been particularly shown and described with references to preferred embodiments thereof, it will be understood by those skilled in the art that various changes in form and details may be made therein without departing from the scope of the invention encompassed by the appended claims.

In some embodiments, this invention features inkjet inks that comprise a cellulose-based polymer in an amount of between about 0.1% to about 10% by weight of the ink composition and a liquid carrier in an amount of between about 10% to about 90% by weight of the ink composition. In further embodiments, the inkjet inks of the present invention also comprise one or more reactants and optionally photoinitiators. One or more colorant components and one or more additional additives can also be included in the inkjet inks of the present invention.

In some embodiments of the invention, the inkjet inks are environmentally friendly. The environmentally friendly inkjet inks include ingredients that are inherently less toxic, less environmentally persistent, less bioaccumulative, and that degrade to substances with similar positive characteristics when compared to ingredients used in conventional formulations. Their ingredients have a more positive profile than those in conventional printing inks. For example, solvents that are not hazardous air pollutants, have low volatility, and pose no threat to the Earth's ozone layer; biodegradable surfactants, with byproducts that are less toxic than the parent compound; and other components with a more positive environmental profile. The environmentally friendly inkjet inks of the invention have in general the following features:

| Ingredient | Key Evaluation Characteristic |
| --- | --- |
| Solvent(s) | Low health and environmental concerns-green chemistry recognized. |
| Binder | Low health and environmental concerns. |
| Pigment | Low health and environmental concerns. |
| Wetting agent | Readily biodegradable, low concern for byproducts |
| Surface Tension Modulator | Low health and environmental concerns. |
| Preservative | Acceptable as formulated. |
| Light Stabilizer | Relatively more positive profile than conventional ones. |

The environmentally friendly inkjet inks of the invention are not only environmentally friendly but also help ensure a safer workplace. Printers and other users of these inkjet inks benefit from ingredients that include no strong, volatile solvents or other chemicals of concern.

Cellulose-Based Polymer

The inkjet inks of the present invention include a cellulose-based polymer in an amount between about 0.1% to about 10% by weight of the inkjet ink composition. As used herein, a "cellulose-based polymer" is a linear or branched polysaccharide polymer with a plurality of glucose monosaccharide units connected by 1,4'-β-glycoside bond.

The exact species of cellulose-based polymer used in the inkjet inks of the present invention depends on the needs of a given application. The cellulose-based polymer(s) should be chosen to be compatible with the other components of the ink. Potentially suitable cellulose-based polymers include nitrocellulose-based polymers and other cellulose-based polymers that include repeating units having one or more different or similar substituent groups. For example, in some embodiments, the inkjet inks of the present invention include a nitrocellulose-based polymer with one or more of the repeating units having one or more nitro groups (e.g., a nitrocellulose resin that is soluble in alcohols, esters, ketones, and/or glycol ethers; a nitrocellulose resin that has a nitrogen content of about 13.8% or less; a nitrocellulose resin that has a nitrogen content in the range of between about 12.3% and about 1.8%; a nitrocellulose resin that has a nitrogen content in the range of between about 11.8% and about 11.3%; a nitrocellulose resin that has a nitrogen content in the range of between about 11.3% and about 10.7%; and/or a nitrocellulose resin that has a nitrogen content of about 10.7% or less). In other embodiments, the inkjet inks of the present invention include one or more cellulose acetate butyrate (CAB) resins.

Liquid Carrier

The inkjet inks of the present invention include a liquid carrier in an amount between about 10% to about 90% by weight of the inkjet ink composition. The liquid carrier can include one or more solvents, diluents, or mixtures thereof. Without intending to be held by a particular mechanism, it is believed that solvents assist adhesion to the substrate by enhancing the ability of the ink composition to wet out the substrate. It is further believed that some solvents can dissolve at least a few top monolayers of the substrate surface, thereby increasing the compatibility of the ink with the substrate.

Generally, the liquid carrier is selected based on several criteria depending upon the needs of a given application. For example, the liquid carrier component(s) can be selected based on their performance (e.g., their wetting and/or dissolving properties with respect to the substrate), their compatibility with other ink components (e.g., the ability to dissolve the other ink components), their effect on the viscosity of the result ink blend, their compatibility with printing equipment, their cost, and other physical properties (e.g., evaporation rate, flash point, ability to biodegrade, odor, and toxicity).

Examples of potentially suitable liquid carriers include ethyl lactate. In another example, 2-butoxyethyl acetate also performs well with respect to styrene substrates. Hydrocarbon solvents are expected to impart good adhesion properties to less polar substrates, e.g. polyolefin substrates.

Practically, solvents also are selected based on safety, since highly flammable and highly volatile solvents pose fire hazards when jetted at high temperatures, e.g., 55° C., and when used near an ignition or spark source. Solvents with a flash point of greater than 141 Fahrenheit (about 45.5° C.) are preferred. Also preferred are environmentally acceptable, biologically-derived solvents, and especially those derived from renewable resources. As used herein, "biologically-derived solvents" include solvents that occur naturally and have extremely low toxicity, such as ethyl lactate. For example, ethyl lactate occurs naturally in apples, citrus fruits, pineapple, peas, alcoholic beverages, vinegar and cocoa. Preferred biologically-derived solvents do not include ethylene glycol ethers, benzyl alcohol, cyclohexanone, aromatic hydrocarbons and vinyl ester.

Colorant Components

In some embodiments, the inkjet inks of the present invention include one or more colorant components, such as one or more dyes and/or pigments. Dyes and pigments that resist fading are preferred. Examples of a suitable amount of colorant components to include in the ink composition are in the range of from 0% (for producing a clear coating) to about 30% by weight of the inkjet ink composition. Preferably, the dye and/or pigment component is present in the ink composition in an amount of about 20% or less by weight of the inkjet ink composition, more preferably in an amount of about 15% or less by weight of the inkjet ink composition.

Both organic and inorganic pigments can be incorporated in the ink composition of the invention. Examples of pigments include carbon black, iron oxide black, iron oxide yellow, vanadium-& chromium-based pigments and titanium oxide ($TiO_2$).

Suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines, and others known in the art.

Pigments that can be employed are available commercially under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 151, Pigment Yellow 154, Pigment Yellow 155, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England).

In forming the ink composition of the invention, a solid pigment can be combined with one or more liquid materials to form a pigment slurry, preferably a pigment dispersion. A pigment can be comminuted, for example by milling, to a desired size, followed by mixing with one or more liquid ingredients to form the pigment dispersion. The amount of pigment in the dispersion can vary widely.

Typically, the amount of pigment present in the pigment dispersion is in the range of from about 20% to about 75% by weight of the pigment dispersion. For example, the amount of pigment in cyan, magenta, yellow, and black pigment dispersions is commonly in the range of between 25% and about 30% by weight of the pigment dispersion. The amount of pigment in spot color pigment dispersions is preferably in the range of from about 20% to about 30% by weight of the pigment dispersion. White pigment dispersions typically include a higher amount of pigment, with the pigment component of the dispersion commonly forming about 70% to about 75% of the weight of the dispersion. Pigment dispersions can contain any amount of pigment, with the more concentrated dispersions being generally preferred.

Pigment dispersions are also available commercially. Example of commercially available dispersants suitable for this application include those sold under the trade designations SOLSPERSE® from Avecia, Inc. of Wilmington, Del., EFKA® from The Lubrizol Corp. of Wickliff, Ohio, and BYK® from BYK Chemie, USA of Wallingford, Conn. It is possible to use mixtures of dispersants also.

The amount of pigment dispersion added to the inkjet ink formulation depends on the type and concentration of the pigment as well as the demands of a given inkjet application and the limitations of the printing process or equipment. Preferably, the amount of dispersant used does not cause the final inkjet ink composition to have an undesirable viscosity.

Reactants

In some embodiments, the inkjet ink composition includes at least one reactant that can participate in polymerization and/or crosslinking reactions when cured by exposure to radiation, such as actinic radiation (e.g., ultraviolet radiation). Polymerization and/or crosslinking reactions take place, for instance, via cationic or free radical mechanisms, during radiation-curing of the inkjet ink of this invention and result in a hardened material, such as print on a substrate.

The reactant component comprises one or more species of monomers or oligomers having at least one functional group. For example, suitable reactants for use in this invention include monomers and oligomers that are mono-, di-, and/or tri-functional as well as monomers and oligomers having more than three functional groups. In some embodiments, the oligomers are reactive dimers, reactive trimers, reactive tetramers, etc. Preferably, the oligomers used as reactants in the present invention have 10 or fewer repeating units. More than one type of reactants can also be used.

Generally, the reactants are chosen based on their physical properties in view of the demands of the printing application of interest. For example, the reactant(s) incorporated into the inkjet inks can be chosen based physical properties such as the ability of the reactant to undergo free radical polymerization, the rate at which the reactant will polymerize by such a mechanism, the glass transition temperature of the polymerized reactant, and the percent that the polymer can be elongated without breaking, the viscosity of the reactant when in the liquid state under the storage and process conditions of interest, and the degree of adhesion of the cured mixture containing the reactant to the desired substrates or image recording elements.

Examples of suitable reactants, depending upon the needs of the application, can include acrylic esters, acrylate monomers and oligomers, aliphatic urethane acrylates, aliphatic urethane methacrylates, aromatic urethane acrylates, aromatic urethane methacrylates, diacrylate monomers, dimethacrylate monomers, high functionality acrylate monomers (e.g., those acrylate monomers having a functionality of higher than 3), high functionality methacrylate monomers (e.g., those methacrylate monomers having a functionality of higher than 3), low viscosity acrylic oligomers (e.g., acrylic oligomers having a viscosity of about 300 cP or less at 25° C.), methacrylate monomers, triacrylate monomers, and trimethacrylate monomers. The total amount of reactants present in the inkjet ink composition is in the range of between about 0% to about 80%, preferably no greater than about 70%, by weight of the ink composition. Additional examples of compounds useful as reactants in the present invention include isooctal acrylate (a monofunctional monomer), cyclic trimethylolpropane formal acrylate (a monofunctional monomer), 1,6-hexanediol diacrylate (a di-functional monomer that is often referred to as "HDA" or "HDODA"), propoxylated hexanediol diacrylate (a di-functinal monomer that is often referred to as "(PO)HDODA"), dipropylene glycol diacrylate (a di-functional monomer), trimethyolpropane triacrylate (a tri-functional monomer often refered to as "TMPTA"), 3-mole ethoxylated trimethylolpropane triacrylate (a tri-funcational monomer often referred to as "(EO)TMPTA"). In some embodiments, the reactant includes a hyper-branched monomer that has, for example, a functionality of 8, 16 or greater than 16. In a preferred embodiment, the reactant includes triacrylate, diacrylate, triacrylate ester, diacrylate ester or a mixture thereof.

In other embodiments, the inkjet ink composition does not include any reactants. The addition of the reactant(s) in the inkjet ink composition typically depends upon the type of printer for which the ink will be used. When the reactant(s) is included in the ink composition, more of the droplet of ink remains on an image-receiving element, resulting in lower emissions. Also, depending upon whether or not the reactant(s) is used, resulting images look different. Generally, inks with the reactant(s) are used on printers having UV light sources intended to set the ink from liquid to solid state immediately after droplet deposition on a substrate. Inks without the reactant(s) generally rely on solvent/liquid carrier evaporation to convert the liquid ink droplets from liquid to a solid state. Evaporation of solvent/liquid carrier may also be aided by heating the substrate or by directing ambient air or heated air toward the deposited droplets by various means either before or after printing, or both. For example, a platen heater can be located beneath the substrate to warm the substrate. Alternatively, ambient air or heated air can be directed toward the deposited ink droplets using blowers, fans, air knife or similar devices.

Photoinitiators

In some embodiments, the inkjet ink includes one or more photoinitiator components together with the reactant(s). As with all of the components of the present invention, the photoinitiator(s) are chemically compatible with the other components of the inkjet ink so that the resulting ink has the desired properties and will perform satisfactorily in a given application of interest. Examples of suitable photoinitiators include substituted or unsubstituted phosphine oxides and ketones (R(CO)R', where R and R' are substituted or unsubstituted alkyl or aryl groups), such as substituted or unsubstituted alkyl phenyl ketones, acetophenones, benzophenones and quinones, depending upon the needs of a particular application. Specific examples include 2,2-dimethyl-2-hydroxy-acetophenone; 1-hydroxy-1-cyclohexyl-phenyl ketone; 2,2-dimethoxy-2-phenylacetophenone; 2-benzyl-2-dimethylamino-1-(4-morpholinophenyl)-butan-1-one; 2-methyl-1-[4-(methylthio)phenyl]-2-morpholino-propan-1-one; 2,4,6-trimethylbenzyl-diphenyl-phosphine oxide, 1-chloro-4-propoxythioxanthone; isopropyl thioxanthone (mixture of 2- and 4-isomers); blends of bis(2,6-dimethoxybenzoyl)-2, 4,4-trimethyl pentyl phosphine oxide and 1-phenyl-2-hydroxy-2-methyl propanone; blends of bis(2,6-dimethoxybenzoyl)-2,4,4-trimethyl pentyl phosphine oxide and 1-hydroxy-cyclohexyl-phenyl ketone, bis(2,4,6-trimethylbenzoyl)phenylphosphine oxide; and camphorquinone. Commercially available free-radical generating photoinitiators suitable for the invention include, but are not limited to benzophenone, benzoin ether, and acylphosphine photoinitiators such as those sold under the trade designations IRGACURE® and DAROCURE® from Ciba Specialty Chemicals of Tarrytown, N.Y.

The type of photoinitiator used generally depends on the choice of colorant in the ink and on the wavelength of the curing radiation. The photoinitiators included in the inkjet ink should be compatible with the other components of the inkjet inks. Preferably, the photoinitiators are environmentally benign.

Generally, the initiator component is present in the ink composition of the invention in an amount in the range of from about 0% to about 25% by weight of the inkjet ink composition.

Additional Additives

In some embodiments, the inkjet ink composition includes at least one additional additive. Examples of additional additives that can be included in the inkjet ink composition are anticrater additives, antioxidants, antistatic agents, bactericides, binders, deaerating agents, defoaming agents, dispersing agents, flow or other rheology control agents, foaming agents, gloss agents, fungicides, hydrophobing agents, leveling agents, oils, opacifiers, organic and/or inorganic filler particles, plasticizers, slip modifiers, stabilizing agents, surface tension modifying agents, surfactants, thixotropic agents, UV absorption agents, waxes, and wetting agents. The total amount of additional additives that can be included in inkjet ink composition is in the range of between about 0% to about 10% by weight of the ink composition.

For example, to enhance durability of a printed image graphic, especially in outdoor environments exposed to sunlight, a variety of commercially available stabilizing chemicals can be added to the ink composition. These stabilizers can be grouped into the following categories: heat stabilizers, ultra-violet light stabilizers, and free-radical scavengers. Heat stabilizers are commonly used to protect the resulting image graphic against the effects of heat and are commercially available under the trade designations MARK® V 1923 (Witco Corp. of Greenwich, Conn.); SYNPRON® 1163, Ferro 1237 and Ferro 1720 (Ferro Corp., Polymer Additives Div., Walton Hills, Ohio). Such heat stabilizers can be present in amounts ranging from about 0.02 to about 0.15 weight percent.

Ultraviolet light stabilizers are commercially available under the trade designations UVINOL® 400 (a benzophenone type UV-absorber sold by BASF Corp. of Parsippany, N.J.), Cyasorb UVl 164 from Cytec Industries, West Patterson, N.J., and TINUVIN® 900, TINUVIN® 123 and/or 1130 UV-absorber (Ciba Specialty Chemicals, Tarrytown, N.Y.) and can be present in amounts ranging from about 0.01 to about 5 weight percent of the total ink.

Free-radical scavengers can be present in an amount from about 0.05 to about 0.25 weight percent of the total ink. Nonlimiting examples of the scavenger include hindered amine light stabilizer (HALS) compounds, hydroxylamines, sterically hindered phenols, and the like.

Commercially available HALS compounds include TINUVIN® 292 (trade designation for a hindered amine light stabilizer sold by Ciba Specialty Chemicals, Tarrytown, N.Y.)

and CYASORB® UV3581 (trade designation for a hindered amine light stabilizer sold by Cytec Industries, West Patterson, N.J.).

Although stabilizers can be added in small amounts, it is preferred to use as little as possible (or none) to prevent interference with the reaction of the cure.

A wide variety of gloss agents also can be used. Examples include aminobenzoates, secondary amines, silicones, waxes, morpholine adducts, and the like.

In some embodiments, the inkjet inks of the present invention include hydroquinone (HQ) and/or hydroquinone mono methyl ether (MEHQ) to inhibit polymerization of the reactants. HQ is known to cause yellowing if oxygen is not present or becomes depleted. Optionally, tetramethylthiuram monosulfide can be included in the inkjet inks to promote stability if oxygen becomes depleted.

Preparation of the Inks

Generally, materials employed in forming the ink compositions of the invention are commercially available. The ink compositions of the invention are prepared by combining these materials in a single step or in several steps. Mixing techniques that can be employed are known in the art. For example, all ingredients can be combined in one step and blended, stirred, milled, or otherwise mixed to form a homogeneous composition. In another embodiment, at least some of the curable components and, optionally, at least some of the solvent are blended together, with the remaining constituents being incorporated into the resulting composition via blending, milling, or other mixing technique.

In one example, an ink composition of the invention is prepared by adding the pigment slurry first. High viscosity components are added next, followed by the lower viscosity components. Note that components need not be added in descending order of viscosity, only those that are notably higher are preferably added first. Initiators, if used, are preferably added last to prevent curing of the ink during processing.

Ink Properties

Viscosity and surface tension are believed to play a major role in jetting characteristics of an ink, for instance in droplet shape and satellite formation, thus affecting resulting print quality. Inks whose surface tension is greater than about 30 dynes/cm, for example, often have poor jettability, seen as misdirects, satellites, and poor dot gain. As known in the art, while still in a fluid state, viscosity and surface effects can cause ink deposited on a substrate to contract, this phenomenon being known as "negative dot gain." Ink compositions also can display a "positive dot gain," where the dot expands and spreads out.

The ink compositions of the invention have optimal drop formation, minimal satellite formation, and good frequency response. Satellites are breakaway trailing droplets from high velocity droplets. They occur when trailing fluid breaks away from a high velocity droplet. The resulting satellite is lower velocity, resulting in loss of image definition. Good frequency response means that the ink jets consistently well for the full range (or most of the range) of print head frequencies. Optimal drop formation occurs when there are no/few satellites, and with good frequency response.

Generally, the ink compositions of the invention have a viscosity that is less than 20 cP at a jetting temperature of ~45° Celsius, preferably in the range of from about 5 cP to about 20 cP at a jetting temperature in the range of ~40° Celsius to ~50° Celsius.

The ink compositions of the invention generally have a surface tension below 30 dynes/cm at about 25° Celsius. Ink compositions having a surface tension below about 30 dynes/cm at about 25° Celsius are preferred and those having a surface tension in the range of from about 25 to about 30 dynes/cm at about 25° Celsius are especially preferred.

A water resistance test also can be performed, as described below: An absorbent cloth (Kimberly-Clark Crew Wipers), about 3"×3" (the exact dimensions are not important, there need only be enough area to do a valid pencil test), is placed on a cured film. The cloth is then saturated with distilled water and allowed to stand in this way for 5 minutes. The cloth is removed, and the film is immediately and gently padded dry. A pencil hardness test on the film is immediately performed and data recorded. The phenomenon is generally reversible and one can measure the time it takes to recover to within one hardness value of original hardness by repeating the test periodically until recovery. For example, some inks take hours to recover, whereas others take less than 30 minutes. Preferably, the ink compositions of the invention recover their original hardness in less than 5 min or retain their hardness on certain substrates.

In some embodiments, this invention features methods of applying indicia to a substrate using an inkjet ink of the present invention. For example, the methods can comprise the steps of applying a stream of ink droplets to a substrate, wherein said ink droplets include a nitrocellulose polymer in an amount of between about 0.1% to about 10% by weight of the ink droplets and ethyl lactate in an amount of between about 10% to about 90% by weight of the ink droplets, and controlling application of the stream electronically so that the droplets form at least one printed image on the substrate, thereby applying indicia to the substrate.

The inks of this invention adhere to a surprisingly wide range of substrate materials. Examples of suitable substrate material to which the inks of this invention will adhere include, but are not limited to, glass and polymers (e.g., polyethylene terepthalate glycol (PETG), polycarbonate, acrylic, polystyrene, polypropylene, acrylonitrile butadiene styrene (ABS), and rigid and flexible polyvinyl chloride (PVC)).

In some embodiments, this invention features an article comprising a substrate with a surface and at least one image printed on said surface through the deposition of an inkjet ink of the present invention.

The present invention is illustrated by the following examples, which are not meant to be limiting in any way.

EXAMPLES

Example 1

Formulations of Inks

Several inkjet ink formulations were produced and used for the adhesion testing. When making less than 500 g of ink, all components were weighed directly into a brown HDPE Nalgene® bottle. After final addition the bottle was capped tightly and shaken for about one minute. The bottle was then shaken periodically followed by visual inspection to determine whether soluble components (previously solids) had gone into solution. Mild heating up to 40° C. was frequently used to accelerate dissolution of the soluble components.

When making more than 500 g of ink, clear/colorless and solid components were weighed into a suitable container (i.e., a container that was compatible with the chemicals being mixed, preferably made of an opaque or light blocking material such as pigmented polyethylene or stainless steel) equipped with an overhead low speed stirrer. A slotted lid was typically applied whereby the slot allows placement of the lid while the mix shaft extends with impeller into the liquid mixture, placed off-center. The ink components were stirred to form a homogeneous blend of all components. Miscible liquids mixed readily under low shear conditions, while soluble solid components required extended mixing time at room temperature to go into solution. Soluble solid components are preferably in the form of free-flowing small particles with the highest ratio of surface area to weight, thus maximizing the rate of dissolution. Continuous stirring was used to dissolve all soluble components. Visual confirmation of the existence of a uniform homogeneous solution is performed before adding any pigment or colorant component.

The blended ink product was then passed through a 1.5 micron pleated polypropylene filter in preparation for jetting. Tables 1 and 2 recite examples of the formulations of the inks of the invention.

TABLE 1

Formulation of inks that do not include a reactant

| Component Name | Function | CAS # | C* wt % | M* wt % | Y* wt % | K* wt % |
|---|---|---|---|---|---|---|
| Ethyl Lactate | Primary Solvent | 97-64-3 | 89.37 | 89.32 | 90.35 | 90.55 |
| Nitrocellulose | Binder | 9004-70-0 | 6.64 | 6.65 | 5.78 | 6.68 |
| Isopropanol | Raw Material Processing Solvent | 67-63-0 | 0.31 | 0.31 | 0.27 | 0.30 |
| B Cu Phthalocyanine Blue | Colorant | — | 2.60 | — | — | — |
| Quinacridone Magenta | Colorant | — | — | 2.51 | — | — |
| Azo Yellow | Colorant | — | — | — | 2.10 | — |
| Carbon Black | Colorant | 1333-86-4 | — | — | — | 1.85 |
| 2-Methoxymethyle thoxypropanol | Wetting Agent/Surfactant | 34590-94-8 | 0.26 | 0.25 | 0.29 | 0.23 |
| Technical White Oils | Dynamic Suface Tension Modifier | 8001-26-1 | 0.24 | 0.23 | 0.27 | 0.21 |
| 2,6-Di-Terbutyl-P-Cresol | Dynamic Suface Tension Modifier | 128-32-0 | 0.24 | 0.23 | 0.27 | 0.21 |
| Decanedioic Acid | Light Stabilizer/UV absorber | 129757-67-1 | 0.26 | 0.45 | 0.53 | — |

C* = Cyan; M* = Magenta; Y* = Yellow; K* = Black

TABLE 2

Formulation of inks that include a reactant(s)

| Ingredient | CAS Number | C* Wt. % | M* Wt. % | Y* Wt. % | K* Wt. % |
|---|---|---|---|---|---|
| Trimethylolpropane Triacrylate (TMPTA) | 15625-89-5 | 20.5 | 17 | 17 | 19.5 |
| Dipropylene glycol diacrylate | 57472-68-1 | 18.2 | 11 | 3.3 | 15.2 |
| Nitrocellulose Resin | 9004-70-0 | 2.75 | 2.75 | 2.75 | 2.75 |
| Dibutyl Phthalate | 84-74-2 | 0.375 | 0.375 | 0.375 | 0.375 |
| Siloxanes and Silicones, di-Me,3-{[2-Hydroxy-3((1-oxo-2-propenyl)oxy)propyl]oxy}propyl Me,3-{[2-hydroxy-3-3(acetoxy)propyl]oxy} | 125455-51-8 | 0.1 | 0.1 | 0.1 | 0.1 |
| Polyether-modified polysiloxane: (0.5% Octamethylcyclo-tetrasiloxane) | — | 0.1 | 0.1 | 0.1 | 0.1 |
| Tetramethylthiuram monosulfide | 97-74-5 | 0.1 | 0.1 | 0.1 | 0.1 |
| 2-Hydroxy-2-methyl-1-phenyl-1-propanone | 7473-98-5 | 6.0 | 6.0 | 6.0 | 6.0 |
| Phosphine oxide, phenylbis(2,4,6-trimethyl benzoyl) | 162881-26-7 | 1.5 | 1.5 | 1.5 | 1.5 |
| hydroxycyclohexyl-phenyl-ketone | 000947-19-3 | 7.5 | 7.5 | 7.5 | 7.5 |
| Ethyl-L-Lactate | 687-47-8 | 36.9 | 43.6 | 44.3 | 36.9 |
| Propoxylated Neopentyl Glycol Diacrylate Esters | 84170-74-1 | 2.1 | 2.5 | 3.97 | 3.75 |
| Propoxylated 1,6 Hexanediol Diacrylate | 84170-73-0 | 2.1 | 2.5 | 3.97 | 3.75 |
| Alkoxylated Aliphatic Diacrylate Ester | — | — | — | 2.5 | 3.97 | — |
| B Cu Phthalocyanine Blue | — | 1.8 | — | — | — |
| Quinacridone Magenta | — | — | 2.5 | — | — |
| Azo Yellow | — | — | — | 5.10 | — |
| Carbon Black | 1333-86-4 | — | — | — | 2.50 |

C* = Cyan; M* = Magenta; Y* = Yellow; K* = Black

Example 2

Adhesion Tests

Adhesion tests of inks of Table 2 were carried out. A suitable test to determine adhesion of the printed image to the substrate is set forth in the ASTM (American Society for Testing and Materials) Designation D 3359-97, *Standard Test Methods for Measuring Adhesion by Tape Test*. Briefly, an ink composition of the invention exhibits an adhesion of at least 95% when measured by a standard cross-hatched tape test with a 1.5 mm grid spacing, when applied to at least three different substrate type materials. As used herein the term "multiple substrates" refers to at least three different substrate type materials towards which one ink composition when cured, has an adhesion that is at least 95% when measured by a standard cross-hatched tape test with a 1.5 mm grid spacing. The three or more substrates can be selected from polyolefin, polycarbonate, vinyl, polystyrene containing plastics, ABS, or polyester substrates.

Adhesion, hardness and viscosity tests of the inks of the present invention (Ink 14) were performed on a variety of substrates. The formulation of Ink 14 is as presented in Table 2. As controls, adhesion, hardness and viscosity tests of Brand A UV Curable ink were also performed. Adhesion was measured according to ASTM D3359 Method B at 10 minutes and 24 hours after printing with a PressVu® 180EC, manufactured by VUTEk, Inc., Meredith, N.H., U.S.A. Pencil hardness on PETG at 10 minutes and 24 hours was also measured. Viscosity was measured by a method using an efflux cup(s), which is widely known in the art. Typically, for the efflux cup(s) method, the cup is filled by dipping into a liquid sample and quickly lifting the cup back out while simultaneously starting a stop watch. Generally, the test is completed when the orifice in the bottom of the cup which controls the rate of efflux becomes visible from the top of the cup.

Tables 3 and 4 show the viscosity values at 45° C. and 50° C., measured by two separate techniques, for the various ink colors. Type 14 ink is an ink in accordance with this invention, whereas Brand A ink is a commercially available ink. In the case of the VUTEk® efflux cup method, the unit of measure is the second, whereas in the case of the A.N.D.® vibro viscometer the unit of measure is cP.

TABLE 3

Comparison of ink viscosity as measured by two separate methods at 45° C.

| @ 45° C. | Vutek Cup (second) | | Electronic meter (cP) | |
|---|---|---|---|---|
| | Brand A | Ink 14 | Brand A | Ink 14 |
| Cyan | 136 | 78 | 20 | 16 |
| Magenta | 124 | 86 | 26 | 18 |
| Yellow | 87 | 93 | 17 | 22 |
| Black | 84 | 79 | 16 | 15 |

TABLE 4

Comparison of ink viscosity as measured by two separate methods at 50° C.

| @ 50° C. | Vutek Cup (second) | | Electronic meter (cP) | |
|---|---|---|---|---|
| | Brand A | Ink 14 | Brand A | Ink 14 |
| Cyan | 77 | 65 | 17 | 14 |
| Magenta | 114 | 73 | 21 | 16 |
| Yellow | 73 | 81 | 14 | 19 |
| Black | 65 | 66 | 12 | 13 |

The inks were printed on a variety of substrates. Large color blocks of CMYK were used as an image and the substrates included 24"×24" sheets of polycarbonate, acrylic, polypropylene, ABS, PETG, untreated polystyrene, untreated glass, foam board, and MII® Vinyl on a roll. Images with a resolution of about 360×400 dots per inch ("dpi") were created with an enhanced fast four mode using light smoothing and a carriage speed of about 60 inches per second ("ips"). The images were double cured at a variety of cure energy levels. In general, the color gamut of the Brand A ink was stronger in the Yellow and Orange region, and Ink 14 was stronger in the green, blue and red region.

Tables 5, 6, and 7 recite the adhesion test results. In general, the higher the number is, the better the adhesion of the ink. The results are the lowest value of 3 separate cross-hatch tape pulls for each testing condition. Adhesion for both inks was found to be excellent on MII® PS Vinyl, PETG, and untreated polystyrene. Brand A ink had a greater adhesion to polypropylene, whereas Ink 14 had a better adhesion to polycarbonate, acrylic, ABS, and untreated glass. Ink 14 also adhered well to a foam board.

TABLE 5

Adhesion results

| Substrate | | | | | |
|---|---|---|---|---|---|
| PS-Vinyl Arlon MII® | | Polycarbonate GE® Lexan Sheet | | Acrylic Lucite® Sheet | |
| Cure Energy | | | | | |
| 100% | | 100% | | 100% | |
| Ink Type | | | | | |
| Brand A | Ink 14 | Brand A | Ink 14 | Brand A | Ink 14 |
| Print Age** | | | | | |
| 10&24 | 10&24 | 10/24 | 10&24 | 96 h | 10&24 |
| Cyan | 5 | 5 | 5 | 5 | 0 | 4 |
| Magenta | 5 | 5 | 5 | 5 | 0 | 4 |
| Yellow | 5 | 5 | 5 | 5 | 0 | 4 |
| Black | 5 | 5 | 5 | 5 | 0 | 4 |
| Red | 5 | 5 | 3/1 | 5 | 0 | 4 |
| Blue | 5 | 5 | 1/0 | 5 | 0 | 4 |
| Green | 5 | 5 | 1 | 5 | 0 | 4 |

**Print Age is 10 minutes, 24 hours, or as labeled after printing

TABLE 6

Adhesion Results

| | Substrate | | | | | |
|---|---|---|---|---|---|---|
| | ABS Sheet | | Glass (untreated) | | Foam Board Gator Foam | |
| | Cure Energy | | | | | |
| | 65% | | 100% | | 65% | |
| | Ink Type | | | | | |
| | Brand A | Ink 14 | Brand A | Ink 14 | Brand A | Ink 14 |
| | Print Age** | | | | | |
| | 10/24 | 10&24 | N/A | 10/18 h | N/A | 10/24 |
| Cyan | 2 | 5 | N/A | 1/5 | N/A | 4 |
| Magenta | 3 | 5 | N/A | 3/4 | N/A | 4 |
| Yellow | 3/4 | 5 | N/A | 4 | N/A | 4 |
| Black | 3 | 5 | N/A | 3/5 | N/A | 4 |
| Red | 0/1 | 5 | N/A | 3/4 | N/A | 4 |
| Blue | 0 | 5 | N/A | 1/4 | N/A | 4/3 |
| Green | 0 | 5 | N/A | 3/5 | N/A | 3 |

**Print Age is 10 minutes, 24 hours, or as labeled after printing

TABLE 7

Adhesion Results

| | Substrate | | | | | |
|---|---|---|---|---|---|---|
| | Polypropylene Coroplast | | PETG Sheet | | Polystyrene Untreated sheet | |
| | Cure Energy | | | | | |
| | 65% | | 100% | | 100% | |
| | Ink Type | | | | | |
| | Brand A | Ink 14 | Brand A | Ink 14 | Brand A | Ink 14 |
| | Print Age** | | | | | |
| | 10/24 | 10/24 | 10&24 | 10&24 | 10&24 | 10&24 |
| Cyan | 4 | 0/2 | 5 | 5 | 5 | 5 |
| Magenta | 4 | 0/2 | 5 | 5 | 5 | 5 |
| Yellow | 5 | 0 | 5 | 5 | 5 | 5 |
| Black | 5 | 0/2 | 5 | 5 | 5 | 5 |
| Red | 5/4 | 0 | 5 | 5 | 5 | 5 |
| Blue | 4 | 0 | 5 | 5 | 5 | 5 |
| Green | 4 | 0 | 5 | 5 | 5 | 5 |

**Print Age is 10 minutes, 24 hours, or as labeled after printing

Example 3

Pencil Hardness

The inks of Table 2 were subjected to pencil hardness testing. The pencil hardness measurements showed that Brand A ink continues to increase hardness after 10 minutes, whereas Ink 14 of the present invention reaches full hardness within 10 minutes of printing. Twenty-four hours after printing, the hardness of Brand A ink is higher than Ink 14. Table 8 summarizes the results of the pencil hardness testing, whereas Table 9 recites the types of lead used to conduct the tests listed in Table 8. In general, the higher the number is, the harder the ink.

TABLE 8

Pencil hardness results as measured on PETG

| | Brand A | | Ink 14 | |
|---|---|---|---|---|
| | 10 minute | 24 hour | 10 minute | 24 hour |
| Cyan | 5 | 7 | 5 | 5 |
| Magenta | 5 | 7 | 5 | 5 |
| Yellow | 5 | 6 | 5 | 5 |
| Black | 4 | 5 | 4 | 4 |
| Red | 4 | 5 | 3 | 3 |
| Blue | 3 | 4 | 3 | 3 |
| Green | 3 | 5 | 3 | 4 |

TABLE 9

Key to Pencil Hardness Data

| Pencil # | Lead type |
|---|---|
| 3 | 2B |
| 4 | HB |
| 5 | 2H |
| 6 | 4H |
| 7 | 6H |

Equivalents

Although this invention has been particularly shown and described with references to preferred embodiments thereof, it will be understood by those skilled in the art that various changes in form and details may be made therein without departing from the scope of the invention encompassed by the appended claims.

What is claimed is:

1. An inkjet ink composition, comprising:
   a) a nitrocellulose polymer in an amount between about 0.1% to about 10% by weight of the inkjet ink composition;
   b) ethyl lactate in an amount between about 10% to about 90% by weight of the inkjet ink composition;
   c) at least one organic pigment dispersion, wherein the total amount of the pigment present in the inkjet ink composition is no greater than about 10% by weight of the inkjet ink composition;
   d) a plurality of additives present in the composition comprising a wetting agent or a surfactant, and a UV absorption agent or a light stabilizing agent, wherein the total amount of additive in the ink composition is no greater than about 10% by weight of the inkjet ink composition;
   e) at least one reactant in an amount no greater than 70% by weight of the inkjet ink composition, the reactant selected from the group consisting of a triacrylate, diacrylate, triacrylate ester and diacrylate ester; and
   f) at least one photoinitiator selected from the group consisting of substituted or unsubstituted ketone and phosphine oxide,
   wherein the inkjet ink composition has a viscosity of about 5 cP to about 20 cP at a jetting temperature in the range of about 40° C. to about 50° C.;
   wherein the inkjet ink composition has a surface tension below 30 dynes/cm at about 25° C.

2. An inkjet ink composition, comprising:
   a) a nitrocellulose polymer in an amount between about 0.1% to about 10% by weight of the inkjet ink composition;
   b) ethyl lactate between about 10% to about 90% by weight of the inkjet ink composition; and c) a plurality of additives present in the inkjet ink composition in an amount between about 0% to about 10% by weight of the inkjet ink composition, the additives comprising:
a surface tension modifying agent;
an ultraviolet light absorption agent;
a gloss agent selected from the group consisting of consisting of:
aminobenzoates,
secondary amines,
silicones,
waxes, and
morpholine adducts; and
a stabilizer comprising at least one of a heat stabilizer, an ultra-violet stabilizer, or a free-radical scavenger;
d) at least one reactant present in the ink jet ink composition in an amount no greater than 70% by weight of the ink composition, the reactant selected from the group consisting of a reactive monomer and a reactive oligomer, and
e) an organic pigment dispersion, wherein the total amount of the pigment present in the inkjet ink composition is no greater than about 30% by weight of the inkjet ink composition;
wherein the inkjet ink composition has a viscosity of about 5 cP to about 20 cP at a jetting temperature in the range of about 40° C. to about 50° C.;
wherein the inkjet ink composition has a surface tension below 30 dynes/cm at about 25° C.

3. The inkjet ink composition of claim 1, wherein the at least one reactant is selected from the group consisting of a reactive dimer, a reactive trimer, a reactive oligomer having more than three functional groups, and a reactive hyperbranched monomer.

4. The inkjet ink composition of claim 2, wherein the reactant is selected from the group consisting of triacrylate, diacrylate, triacrylate ester and diacrylate ester.

5. The inkjet ink composition of claim 2, further comprising at least one photoinitiator.

6. The inkjet ink composition of claim 5, wherein the total amount of photoinitiator present in the inkjet ink composition is no greater than about 25% by weight of the inkjet ink composition.

7. The inkjet ink composition of claim 2, wherein the total amount of pigment present in the inkjet ink composition is no greater than about 15% by weight of the inkjet ink composition.

8. The inkjet ink composition of claim 2, further comprising at least one additive selected from the group consisting of a defoaming agent, a deaerating agent, a wetting agent, a dispersing agent, an anticrater additive, and a light stabilizing agent.

9. A method of applying indicia to a substrate, comprising the steps of:
a) applying a stream of ink droplets to a substrate, using the inkjet ink composition of claim 2; and
b) electronically controlling application of the stream so that the ink droplets form at least one printed image on the substrate;
thereby applying indicia to the substrate.

10. The method of claim 9, where the inkjet ink composition further comprises at least one photoinitiator.

11. The method of claim 10, wherein the total amount of photoinitiator present in the inkjet ink composition is no greater than about 25% by weight of the inkjet ink composition.

12. The method of claim 9, wherein the inkjet ink composition further comprises at least one additive selected from the group consisting of a defoaming agent, a deaerating agent, a wetting agent, a dispersing agent, an anticrater additive, a surface tension modifying agent, and a light stabilizing agent.

13. The method of claim 12, wherein the total amount of additive present in the inkjet ink composition is no greater than about 10% by weight of the inkjet ink composition.

14. The method of claim 9, wherein a portion of the substrate on which the indicia is applied is constructed of glass, a polymer, paper, fabric, metal, or wood.

15. The method of claim 14, wherein the substrate on which the indicia is applied is selected from the group consisting of polyethylene terephthalate glycol, polycarbonate, acrylic, polyester, polystyrene, polypropylene, acrylonitrile-butadiene-styrene, and polyvinyl chloride.

* * * * *